United States Patent
Nguyen et al.

(10) Patent No.: US 6,694,383 B2
(45) Date of Patent: Feb. 17, 2004

(54) HANDLING SERVICE REQUESTS

(75) Inventors: Thai Q. Nguyen, Columbia, SC (US);
Robert J. Miller, Irmo, SC (US);
Kenneth C. Creta, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 10/008,595

(22) Filed: Dec. 6, 2001

(65) Prior Publication Data
US 2003/0110321 A1 Jun. 12, 2003

(51) Int. Cl.[7] .................................................. G06F 3/00
(52) U.S. Cl. ................................... 710/6; 710/5; 710/7
(58) Field of Search .............................. 710/6, 7, 5, 15, 710/16

(56) References Cited

U.S. PATENT DOCUMENTS

| | | | | |
|---|---|---|---|---|
| 5,488,706 A | * | 1/1996 | Wendorf et al. ............. 395/375 |
| 5,923,897 A | * | 7/1999 | Lipe et al. .................... 395/825 |
| 6,009,484 A | * | 12/1999 | Miller .......................... 710/40 |
| 6,021,451 A | * | 2/2000 | Bell et al. .................... 710/128 |
| 6,061,664 A | * | 5/2000 | Pieterse et al. .............. 705/39 |
| 6,202,112 B1 | * | 3/2001 | Gadagkar et al. ........... 710/118 |

* cited by examiner

*Primary Examiner*—Jeffrey Gaffin
*Assistant Examiner*—Alan Chen
(74) *Attorney, Agent, or Firm*—Fish & Richardson P.C.

(57) ABSTRACT

A first component that stores information about requests for information directed to an interface (e.g., a bus of a computer system connected to components), receives an indication of a request sent by a second component to the interface. The first component sends an identifier for a subsequent request to the second component.

24 Claims, 4 Drawing Sheets

HANDLING SERVICE REQUESTS

BACKGROUND

This invention relates to handling service requests.

An input/output (I/O) hub connected to peripheral components, can issue multiple requests for information from the peripheral components. The circuit processes the returned information. Sometimes, the requests are returned in the order in which they are issued. In other cases, the requests are returned in the order in which they are completed by the peripheral component. The completion order can differ from the issuance order.

DETAILED DESCRIPTION

Figure 1:
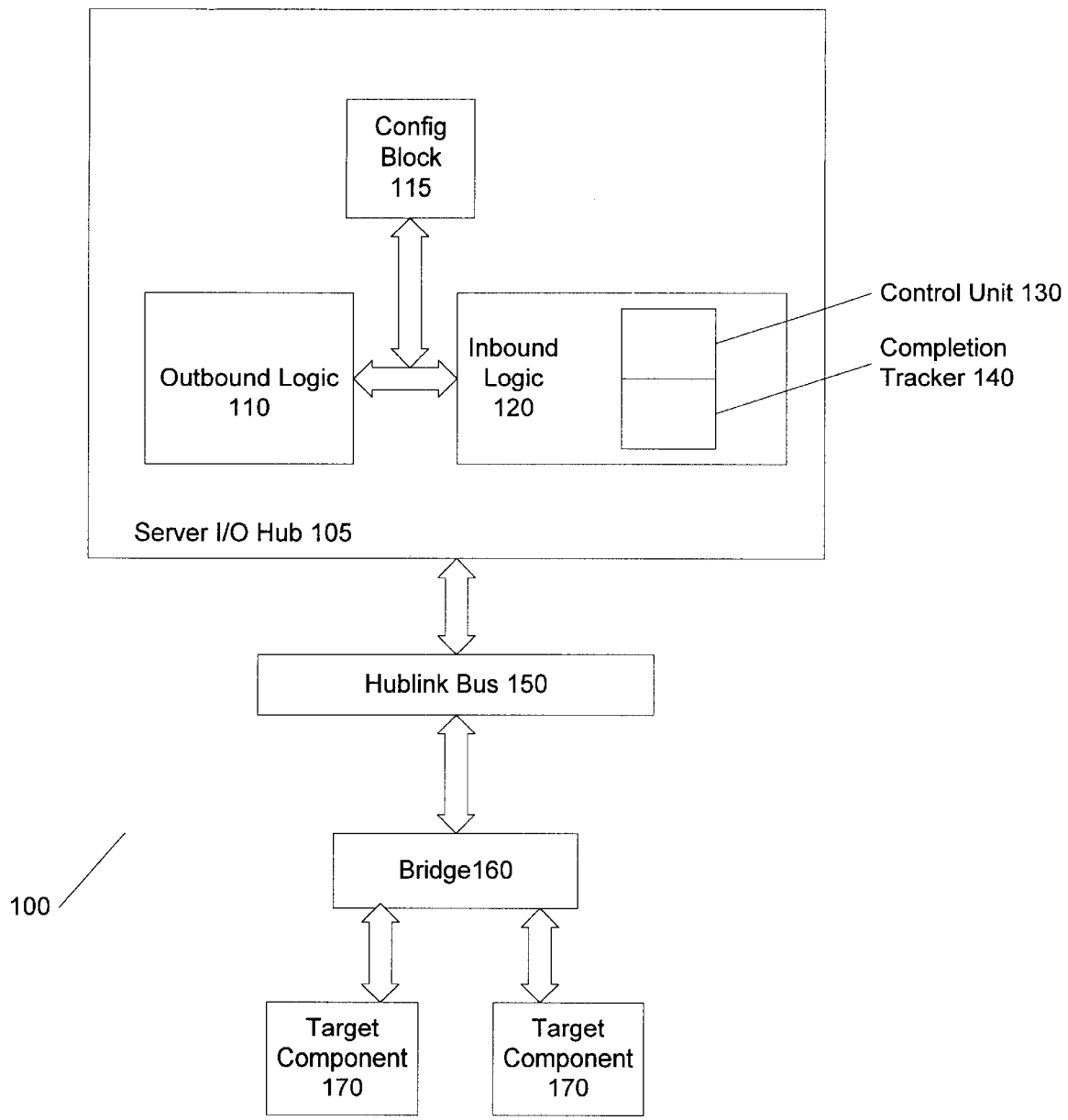
FIGS. 1 and 2 are block diagrams.

Referring to FIG. 1, in a computer system 100, control logic 102 generates and manages identifiers for multiple requests that are made to target components 170 for information to be returned. The control logic enables outbound logic 110 to issue multiple requests that are either ordered or unordered. The ability to handle unordered requests, as well as ordered requests, reduces the delay in receiving completions of these requests.

The control logic is operated separately from the outbound logic so that the outbound logic can send requests as usual without needing to track requests that have been sent, but not yet fulfilled. Thus, the outbound logic is not delayed in sending outbound requests.

Referring to FIG. 1, system 100 includes an input/output (I/O) chip 105, a bus 150, and a bridge chip 160 that is connected to multiple target components 170 (only two are shown, but there may be many). For example, the I/O chip 105 can be a Server I/O Hub Component (SIOH), the bus 150 can be the a Hublink Bus, and the bridge chip 160 can be a peripheral component interconnect (PCI) to PCI bridge. Communication from the I/O chip 105 to the target components 170 is mediated by the bus 150 and the bridge chip 160.

The I/O chip 105 includes the outbound logic 110, an inbound logic 120, and a configuration block 130. The outbound logic 110 generates multiple requests to the target components 170 for information to be returned. Responses to these requests, so-called completions, are returned to the inbound logic 120. The outbound logic can send requests as needed, even before previous requests have been completed.

Figure 2:
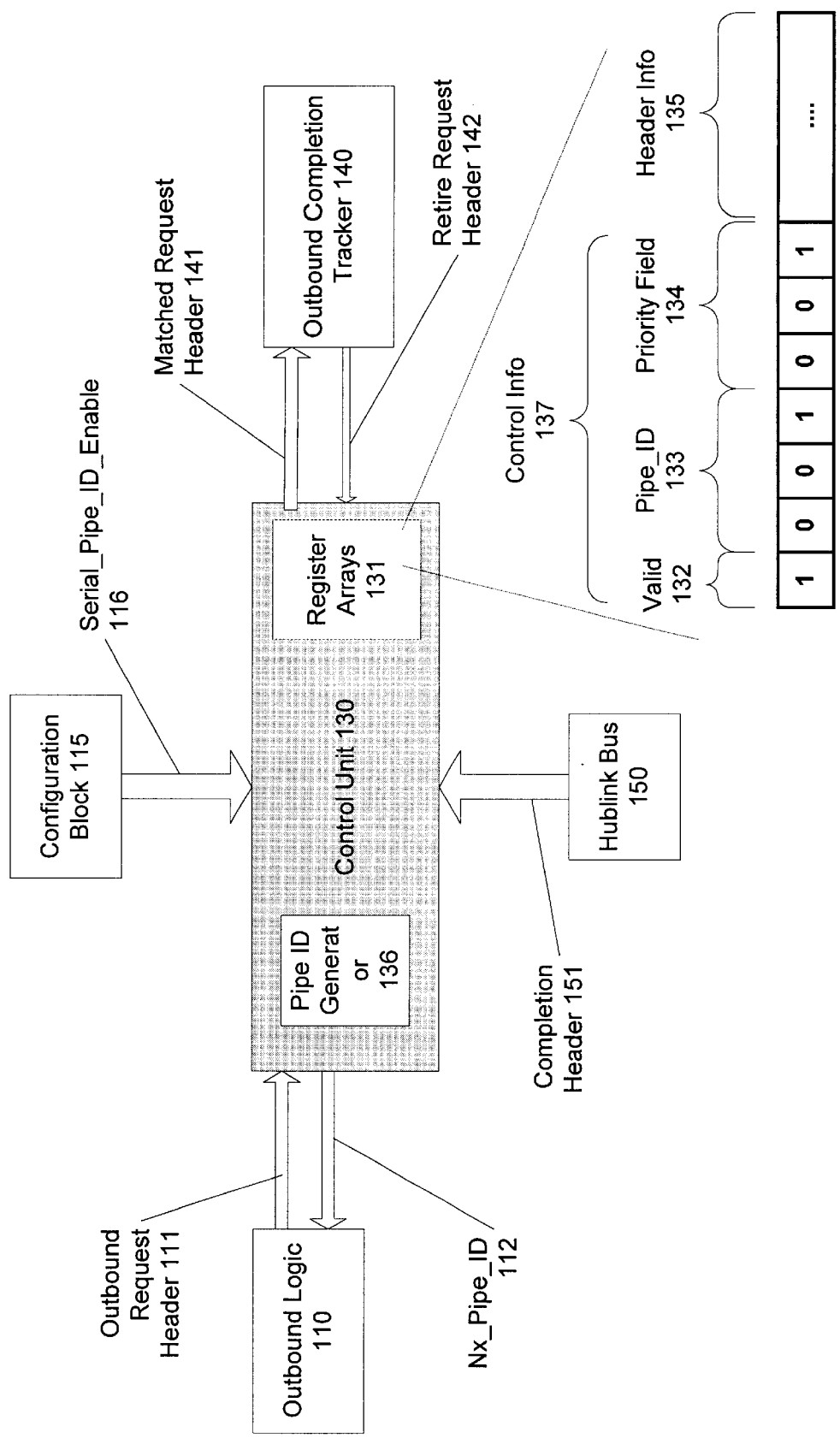

Referring also to FIG. 2, the outbound logic 110 sends the requests to the bridge chip 160 with a request header 111. The request header includes header information 135 that identifies the request and a pipe identifier 112 that was provided by the control unit 130 during the preceding request cycle. That is, in each request cycle, the control unit 130 generates and provides to the outbound logic 110 a pipe identifier 112 to be used in the header of the next outbound request generated by the outbound logic. By "pipe", we mean one or more requests that are ordered with respect to each other. Of course, when the pipe refers to a single request, the order is irrelevant.

The pipe identifier indicates the order of completions for requests in a series of requests. When completions are returned to the SIOH 105, completions having the same pipe identifier are received in the same order by the in bound logic 120 with respect to one another as the order in which the corresponding requests were sent originally by the outbound logic 110. Completions that have different pipe identifiers can be returned to the SIOH 105 in any order with respect to each other.

When the outbound logic 110 sends a request to the bridge chip 160, the outbound logic 110 also sends the request header 111 to the control unit 130.

Figure 3:
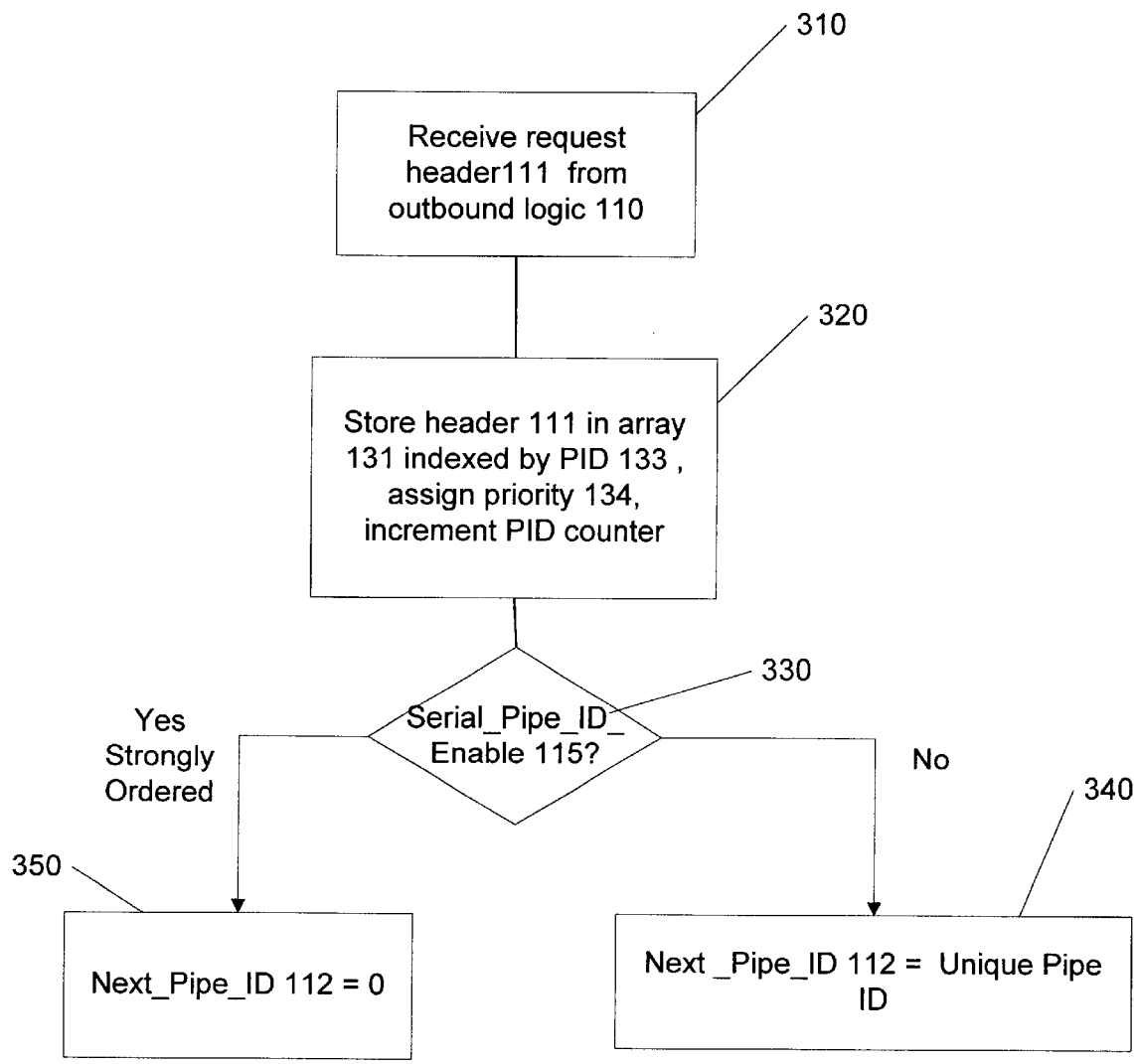
FIGS. 3 and 4 are flowcharts.

Referring also to FIG. 3, after receiving 310 the request header 111, the control unit 130 stores the header 111 in a register array 131. Generally, the control unit 130 includes as many register arrays 131 as the number of outstanding requests that it can handle. Each register array 131 includes seven bits of control information 137: a validity bit 132 that indicates that the request is pending, the pipe identifier 133, and a priority value 134 that defines an order of requests that have a common pipe identifier. The request header also includes the identifying header information 135 used by the outbound logic 110. This header information 135 can include routing information and other pertinent information such as length of transaction, type of transaction (e.g., input/output, memory, or configuration) and completion status (e.g., normal, master, or target abort).

The control unit 130 stores 210 the control information 137 for each request header 111 and the header information 135 in the first empty slot of the register arrays 131. Generally, an empty slot is always available, as the outbound logic 110 is prevented from sending a request if the register arrays are full 131. This check is described below.

When a request header is received from the outbound logic, the seven bits of control information 137 are set 320. First, the valid bit 132 is set to 1, indicating that the slot is occupied by an outstanding (uncompleted) request. Second, the 3-bit pipe identifier field 133 is set. Third, the 3-bit priority field 134 is set to indicate the priority of the current request relative to other requests that have the same pipe identifier. The control unit 130 includes a counter that tracks a current priority value for each outstanding pipe identifier. If the current request has a unique pipe identifier, this field is set to the highest priority value, e.g., 001. If the current request is one of multiple requests that are ordered, then it is given the highest available priority value. For example, the second request in the series would receive a priority value of 010.

The pipe identifier generator block 136 determines 330 the pipe identifier for the next request, Nx_Pipe_ID 112. The determination depends on whether the current request is strongly ordered with respect to other outstanding requests, or if it can be returned in any order. The control unit 130 queries a configuration block 115 for a configuration bit, Serial_Pipe_ID_Enable 116, of the bridge chip 160 to determine if the request requires ordering. Typically, the configuration bit 116 is set when the system 100 is configured, e.g., at start-up or during a reset.

If the bridge chip 160 is configured for out-of-order completions, then the pipe identifier generator block 136 generates a unique pipe identifier for the next request. The block queries each entry of its storage block until it finds an empty slot. It then sets the Nx_Pipe_ID 112 to the number of the empty slot, in this way essentially reserving that slot for use when the outbound logic 110 sends the request.

If there are no empty slots, then Nx_Pipe_ID 112 is not assigned until one of the slots is freed by a completion.

If the target component 170 for the current request requires strongly ordered completions, the block sets Nx_Pipe_ID 112 to 0, or, in some implementations, to the pipe identifier of the current request.

Referring again to FIG. 2, after Nx_Pipe_ID 112 is determined, the control unit 130 sends 114 the Nx_Pipe_ID 112 to the outbound logic 110. As mentioned above, when all register arrays are in use, Nx_Pipe_ID 112 is not valid until a completion is received and a slot in the register array is freed. Consequently, Nx_Pipe_ID 112 is not sent to the outbound logic 110 until a valid value can be assigned. The requirement for an Nx_Pipe_ID 112 at the outbound logic 110 prevents the outbound logic 110 from issuing another request until a completion is received and Nx_Pipe_ID 112 is assigned.

When Nx_Pipe_ID 112 is received, the outbound logic 110 appends Nx_Pipe_ID 112 to the next request header and sends the request header to bus 150 for routing to the bridge 160 and then to target components 170.

Responses for each request are returned by way of the bridge chip 160 to the inbound logic 120 on the I/O chip 105. For any of the outstanding requests, the bridge chip 160 can receive partial or entire completions from the target components 170. For example, the bridge chip 160 might receive four 32-byte completion packets for a 128-byte request.

When returning completions for outstanding requests, the bridge chip 160 compares the pipe identifiers of outstanding requests and determines if they are the same or if they differ. If the pipe identifiers differ, the bridge chip 160 returns packets for the completions as they are received, i.e., whether or not responses are in the original order of their corresponding requests. Conversely, if the pipe identifiers are the same, the bridge chip 160 returns completions for the requests in the original order in which the bridge chip 160 received the requests (i.e., a first-in, first-out order).

Figure 4:
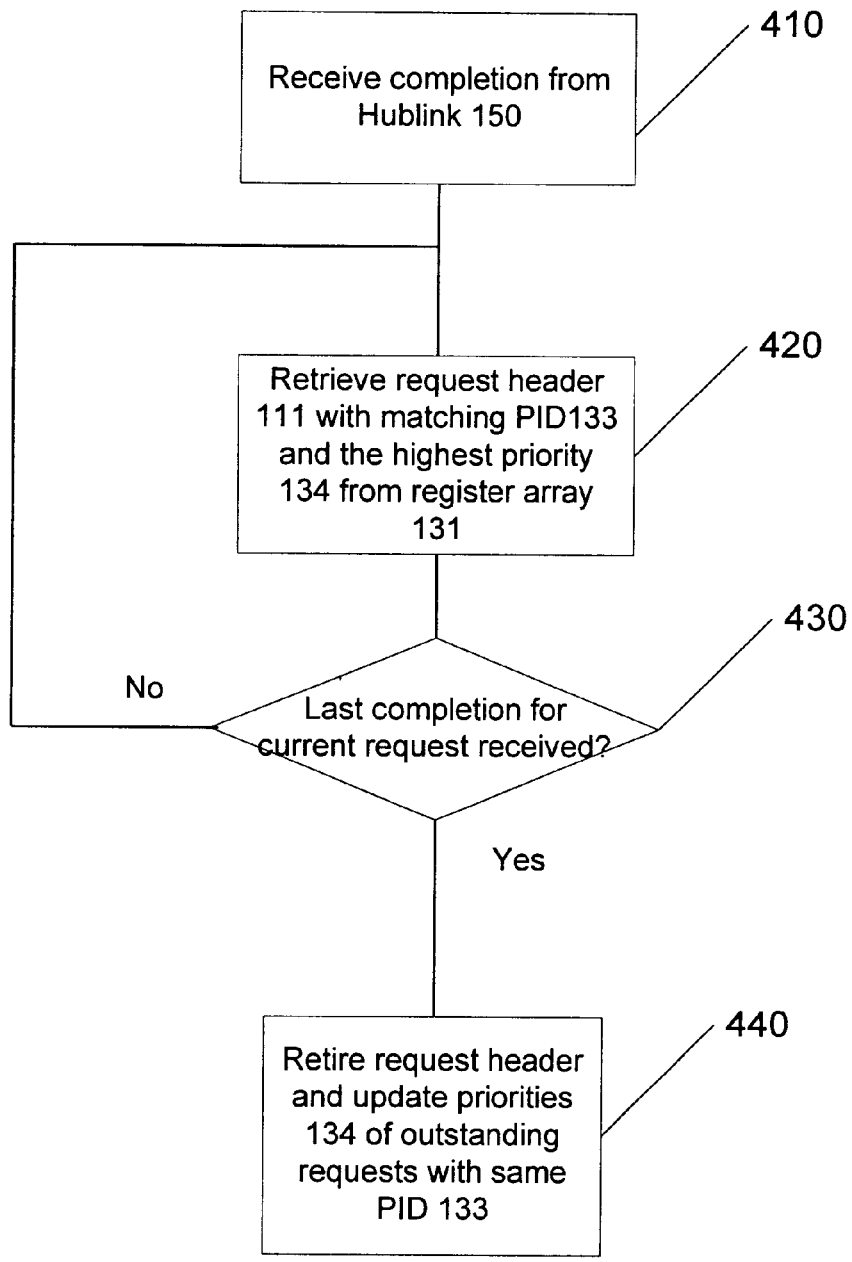

Referring again to FIG. 2 and also to FIG. 4, completion headers 151 for these completions, both partial and entire, are received 410 at the control unit 130 within the inbound logic 120 from the bridge chip 160 by way of the bus 150. The control unit 130 passes the request header 141 of each response to the outbound completion tracker 140 which monitors the multiple partial completions received from the bridge chip 160. Information about the size of the partial completion is used to determine if all required partial completions have been received.

The control unit 130 also matches 420 the pipe identifier of each completion header 151 to the pipe identifiers 133 stored in the register arrays 131 for the outstanding requests.

If different request headers have the same pipe identifier, as is the case for strongly ordered completions, then the request header with the highest priority value is forwarded to the completion tracker 140.

Because the bridge chip 160 returns these strongly ordered completions in the order that it receives them, identifying the highest priority value header for a received completion header in the register arrays 131 invariably matches the correct request header.

The outbound completion tracker 140 is queried 430 to determine if all packets (i.e., partial completions) for the completion in question have been received. If they have not all been received, the control unit 130 does not retire the request.

If they have all been received, then the control unit 130 retires 440 the request. The retiring process includes authorizing the completion to be sent onwards from the I/O chip 105, e.g., to another chip on the chipset, clearing the valid bit in the register array 131 for the retired request to 0, and decrementing the priority field 134 for all other outstanding request headers with the same pipe identifier as the retired request. The decrementing process increases the priority of the outstanding request headers and insures that the completions are retired in order of their priority.

Generally, the storing and retiring operations can occur concurrently on the system 100. A chipset can include multiple instances of the outbound logic 110 and the inbound logic 120 housing the control unit 130. For example, a chipset can include multiple hublink buses 160, each for a particular I/O bridge chip 160. In this case, one set of these logics is used to interface with each of the hublink buses 160. While the different I/O bridge chips 160 can be dedicated respectively for strongly ordered request handling or out-of-order request handling, the control unit 130 is able to manage either mode. Of course, the control unit 130 can also manage both type of requests as is required by a bridge chip 160 that switches between streams that demand strongly ordered completions and streams that accept out-of-order completions.

Other implementations are within the scope of the following claims. For example, the control logic 130 may be located externally to the inbound logic 120. For example, the control unit 130 can be located within the outbound logic 110 using appropriate communication with the inbound logic 120. The completion tracker 140 can likewise be located in either the inbound 110 or outbound logic 120 or neither.

Further, the techniques described here are not limited to any particular hardware or software configuration; they may find applicability in any computing or processing environment. The techniques may be implemented in hardware, software, or a combination of the two. The techniques may be implemented in programs executing on programmable machines such as computers and other devices that each include a processor, a storage medium readable by the processor (including volatile and non-volatile memory and/or storage elements).

Whereas some aspects of the invention are implemented as hardware, other aspects can be implemented in a high-level programming language to communicate with a machine system. However, a program can also be implemented in assembly or machine language, if desired. In any case, the language may be a compiled or interpreted language. An exemplary program is used to control the control unit 130.

A program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be implemented as a machine-readable storage medium, configured with a program, where the storage medium so configured causes a machine to operate in a specific and predefined manner.

What is claimed is:

1. A method comprising:
    sending a first request for information to an interface, the first request including an identifier; and
    assigning an identifier for a subsequent request dependent on an ordering requirement associated with the requests wherein the identifiers of the first and subsequent requests indicate the ordering requirement for the requests, and each of the identifiers comprises a pipe identifier.

2. The method of claim 1 in which the ordering requirement is based on a configuration parameter associated with the interface.

3. The method of claim 1 in which the identifiers indicate that the requested information be received from the interface in a predetermined order.

4. The method of claim 1 in which the identifiers indicate that the requested information may be received in any order for the respective requests.

5. The method of claim 1 in which the subsequent request identifier differs from the identifier for the first request if the ordering requirement allows requested information to be received from the interface out-of-order.

6. The method of claim 1 in which the subsequent request identifier is the same as the identifier for the first request if the ordering requirement requires that requested information be received from the interface in a given order.

7. The method of claim 1 in which the first request includes a request header that comprises the identifier for the first request.

8. The method of claim 1 further comprising storing information that orders the subsequent request with respect to the first request.

9. The method of claim 8 in which the stored information comprises a queue value for the first request and the subsequent request, the method further comprising detecting receipt of information requested by the first request; and updating the queue value for the subsequent request.

10. The method of claim 1 in which the assigning and the sending occur at separate components.

11. The method of claim 10 in which the component that does the sending comprises outbound logic.

12. The method of claim 10 in which the component that does the assigning comprises the control unit.

13. The method of claim 10 in which the component that assigns the identifier also detects receipt of the requested information.

14. The method of claim 10 in which the component that assigns the subsequent request identifier communicates the subsequent request identifier to the component that sends the first request.

15. The method of claim 14 further comprising, at the component that sends the first request, sending the subsequent request, the subsequent request including the subsequent request identifier.

16. The method of claim 1 further comprising: assigning identifiers for additional subsequent requests.

17. The method of claim 1 in which more than two requests are sent prior to receiving information requested by the first request.

18. A method comprising:

at a first component that stores information about requests for information directed to an interface, updates the stored information if requested information for one of the requests is received, and determines from the stored information if the number of requests for which request information has not been received is at a maximum, receiving an indication of a request for information sent by a second component to the interface; and sending an identifier for a subsequent request to the second component.

19. The method of claim 18 in which the requested information for one of the requests is received in multiple packets.

20. The method of claim 18 in which the first component sends the identifier for the subsequent request only if the number of requests for which information has not been received is not at the maximum.

21. The method of claim 18 in which the identifier is included in the subsequent request byte second component to the interface.

22. The method of claim 21 in which the interface determines from the identifier if the information requested by the subsequent request requires ordering relative to information requested by other requests.

23. The method of claim 18 in which the identifier is the same as an identifier for the indicated request if the ordering requirement requires that requested information be received from the interface in the order of the requests.

24. The method of claim 18 in which the subsequent request identifier differs from the identifier for the first request if the ordering requirement allows requested information to be received from the interface out-of-order.

* * * * *